UNITED STATES PATENT OFFICE.

GUSTAV A. UNDEEN, OF PROCTOR, VERMONT.

MANUFACTURE OF POLISHING-STONES.

1,099,831.　　Specification of Letters Patent.　　Patented June 9, 1914.

No Drawing.　　Application filed April 3, 1912.　Serial No. 688,284.

*To all whom it may concern:*

Be it known that I, GUSTAV A. UNDEEN, a citizen of the United States, residing at Proctor, in the county of Rutland and State of Vermont, have invented certain new and useful Improvements in the Manufacture of Polishing-Stones, of which the following is a specification.

This invention relates to the manufacture of polishing stones and has particular reference to a novel composition of matter for forming stones used to polish marble and to a novel process of producing the same.

The object of the invention is to produce a polishing stone, by the use of which a fine finish may be given to even the very poor grades of marble, and to so prepare the ingredients that a stone may be produced which will not scratch or in any way mar the surface to be polished.

Further objects are to produce a composition of the above character which will impart a superior finish to the work by the employment of simple and cheap ingredients and to afford a novel process by which the ingredients are combined in a manner so as to obtain the most satisfactory results.

To these ends, the composition consists of emery powder, shellac, and rosin mixed in the proportions hereinafter recited, with or without the addition of a relatively small quantity of sulfur.

The process consists in melting a quantity of rosin and maintaining the heating thereof for a period of about two hours; in then mixing the rosin with a quantity of shellac, the fluid mixture being then strained and in adding emery powder to the fluid mass with the accompaniment of strong stirring, after which the mass may be run into molds and cast into the desired shape.

In effecting the present invention, I employ the following compositions, it being understood that the proportions refer to parts by volume:

*Composition A.*—Emery powder 1 part, shellac 3 parts, rosin 2 parts.

*Composition B.*—Emery powder 2 parts, shellac 1½ parts, rosin 2 parts.

Composition A will be generally used, the proportions therein recited being best adapted for use in connection with the ordinary grades of marble, while composition B is especially effective for use in connection with the harder grades of marble.

In practice, I use pure Turkish emery powder No. 3F, while the ordinary commercial grades of shellac and rosin will suffice for the purpose.

I will now proceed to describe the manner in which the ingredients are combined for forming the improved polishing stone.

A suitable quantity of rosin is melted and the heating is maintained for about two hours. While I have found that this protracted heating of the rosin is necessary in order to obtain a polishing stone which will not be too hard and gives the desired waxy effect, I am unable to positively state whether there is any chemical change in the rosin as a result of the heating. In view, however, of the superior effect obtained by thus heating the rosin, I am convinced that this step affords a novel and valuable feature of the process. It is likely that certain substances, which in the commercial grades of rosin are found as impurities which may have a deleterious effect on the final product, are volatilized during the heating and are thus eliminated. I then add the melted rosin to the proper quantity of shellac which may be either melted before its addition to the rosin or afterward. The molten mixture is then strained so as to eliminate solid impurities in the rosin and shellac which would tend to scratch or otherwise mar the surface of the marble during the polishing operation. The heating of the mixture of shellac and rosin is then continued for a short period after which the emery powder is added to the mass, it being necessary to strongly stir the mass during the addition of the powder and for several minutes thereafter. At any time after the emery powder has been added, but preferably after the mixture has cooled somewhat, a pinch of sulfur may be added to the mixture, but this is not a necessary feature of the invention. The addition of the sulfur is advantageous, however, in that it prevents the mass from agglomerating, thus rendering the operation of casting easier. After the above operations, the mass is run into molds, where it is allowed to cool and assume the shape desired.

I have found that the inclusion of the rosin prevents the mass from becoming too hard when it is formed into stones, and by the treatment of the rosin above described, that is, heating it for a considerable period, the desired soft waxy effect is obtained in the polishing stones.

By experimentation I have demonstrated that the above theory regarding the volatilization of substances from the rosin by maintaining the same in a molten condition is correct, as I have, by boiling rosin for a period of two hours more or less, found that I have been able to drive off a certain oily substance by which I largely eliminate the production of a gummy compound as usually results from the employment of rosin from which the oily substance or other impurities have not been volatilized. As a matter of demonstration, I have boiled rosin for a period approximating two hours, varying with the grade of rosin employed, and have otherwise carried out the process as above stated, with the result that a polishing stone has been produced capable of giving the finishing polish and starting the gloss on marble. On the other hand, I find that the mere melting of rosin without volatilization therefrom of the foreign substances, and the making of the stone by the employment of rosin with an abrasive compound, which rosin has only been melted, results in the production of a stone having a tendency to gum and adhere to the marble, producing smears and spots, which difficulties I have been able to overcome by the carrying out of the process as above set forth.

While there is no exact or definite period of time during which the rosin must be boiled, I find that approximately two hours is the correct time and the best simple method of testing whether the volatilization has been carried out to the required extent is by the introduction of a small stick into the molten mass and the withdrawal of the stick and cooling of the adhering rosin. Preferably the cooling for this test is accomplished by pouring cold water on the rosin coated stick. When cold, if the coating is hard enough to break easily when the stick is bent, the volatilizing process has been carried out sufficiently, but if when the stick is bent the coating of rosin appears gummy and pliable, then the heating process must be continued until the requiste extent of brittleness is attained. This is obviously only one simple test and other tests may be utilized as preferred, the essential feature of the process, so far as the treatment of the rosin is concerned, residing in the fact that the rosin is heated to the volatilizing point and maintained at such point for a length of time giving it a consistency which will avoid the tendency on the part of the completed stone to spot or otherwise discolor the marble being polished or glossed.

Having thus described the invention, what is claimed as new is:

1. A composition of matter for forming polishing stone, consisting of emery powder, shellac, and the product resulting from the heating of rosin to the volatilization point for about two hours.

2. A composition of matter for forming polishing stone, consisting of one part emery powder, three parts shellac, and two parts of the product resulting from the heating of rosin to the volatilization point for about two hours.

3. The process of manufacturing polishing stone comprising heating two parts of rosin to the volatilization point for about two hours, then melting about three parts shellac and adding the same to the rosin, then straining said mixture to remove all spot producing plasticity and scratch producing matter, then adding one part emery powder to the mass while stirring the same and adding a relatively small quantity of sulfur, and finally casting the mass.

In testimony whereof I affix my signature in presence of two witnesses.

GUSTAV A. UNDEEN.

Witnesses:
H. C. ROBB,
DUDLEY E. BURDINE.